May 26, 1953 W. M. BRUNER ET AL 2,640,041
PROCESS FOR PREPARATION OF MELAMINE-FORMALDEHYDE
REACTION PRODUCTS
Filed March 9, 1950
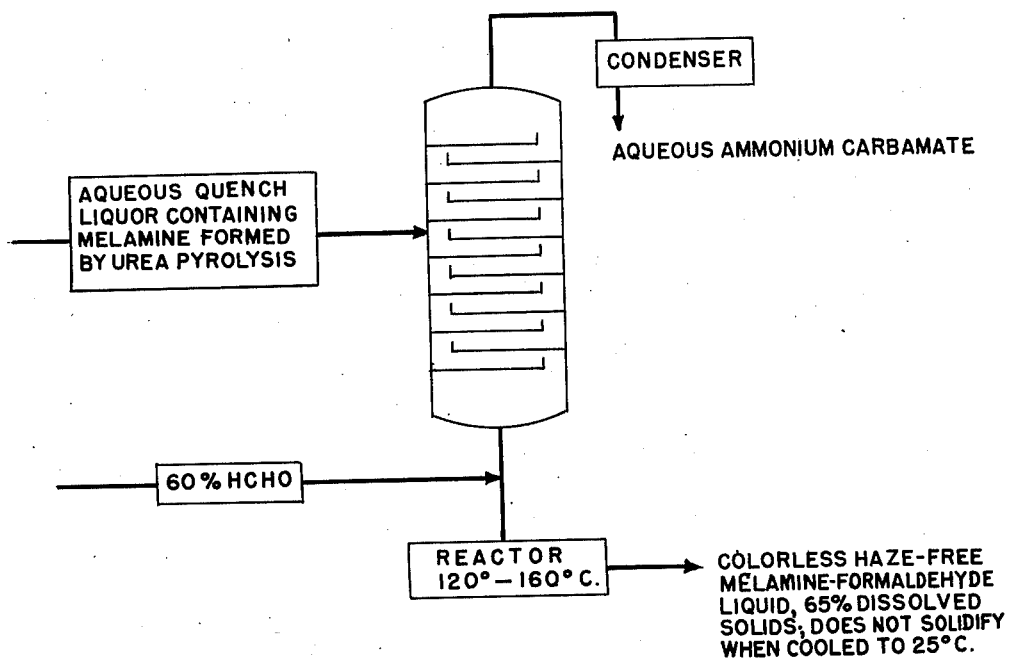
INVENTOR.
WALTER M. BRUNER
and HAMLINE M. KVALNES
BY a. McAlevy
ATTORNEY Patented May 26, 1953

2,640,041

UNITED STATES PATENT OFFICE 2,640,041

PROCESS FOR PREPARATION OF MELAMINE-FORMALDEHYDE REACTION PRODUCTS

Walter M. Bruner and Hamline M. Kvalnes, Wilmington, Del., assignors to E. I. du Pont de Nemours & Company, Wilmington, Del., a corporation of Delaware Application March 9, 1950, Serial No. 148,536

3 Claims. (Cl. 260—29.4)

This invention relates to a process for preparing melamine-formaldehyde reaction products.

It has been known heretofore that melamine can be condensed with formaldehyde at temperatures of about 50° to 90° C. under slightly acidic conditions to produce a viscous resin which is converted to a brittle fusible solid upon removal of water under slightly alkaline conditions (U. S. 2,260,239 and 2,385,333). In the latter process the maximum temperature employed during water-removal is 105°–115° C. Recently novel methods have been disclosed for the manufacture of melamine, e. g. by pyrolysis of urea under pressure (copending Loder application S. N. 504,164, filed September 28, 1943). In the manufacture of melamine from urea it is generally preferred to remove the hot melamine-containing products from the pyrolysis apparatus, or other vessel containing the melamine, by injecting water under high pressure into a side-arm in the exit line, whereby a hot aqueous solution of melamine (having a temperature of at least 140° C.) is formed. The advantages of this method for removing melamine are quite numerous; for example, in this manner impurities are destroyed or removed, and a concentrated aqueous solution of melamine at a temperature above the normal boiling point of water is produced; highly efficient purification of melamine is obtainable by crystallization from such a solution (Lee, U. S. patent application S. N. 570,215, filed December 28, 1944, now U. S. P. 2,549,492). Purification and crystallization of melamine has always been an essential step in the manufacture of melamine for use in production of melamine-formaldehyde condensation products, and since melamine has a low solubility in water at temperatures below 100° C. (Christmann et al. U. S. P. 2,203,860), this purification of melamine by crystallization (prior to the development of the Lee process, described above) has been a substantial contributing factor in the cost of manufacturing melamine and resins derived therefrom.

An object of this invention is to provide an improved process for making melamine-formaldehyde condensation products. Other objects of the invention will appear hereinafter.

It has been discovered in accordance with this invention that aqueous formaldehyde can be advantageously condensed with aqueous melamine at superatmospheric pressures; this permits the use of temperatures higher than those employed heretofore; this also eliminates the necessity for intermediate separation of purified crystalline melamine. It has also been discovered that a melamine-formaldehyde condensation product suitable for use in the manufacture of cured resins can be obtained by subjecting a melamine-containing reaction product, formed by pyrolysis of a substance, such as urea or dicyandiamide, which produces melamine upon pyrolysis under pressure, to the action of water and formaldehyde, without intervening crystallization of the melamine, the mol proportions of formaldehyde to melamine being 4:1 to 15:1, the weight proportion of water:melamine being between 2:1 and 5:1, at a pH of 7 to 9, and a temperature of 120° to 160°, and cooling the resulting mixture after it has remained at the said temperature for from 0.5 to 10 minutes.

The present invention is distinguished from previously disclosed processes (cf. the Lee U. S. P. 2,549,492) in that the aqueous medium in the present invention contains formaldehyde, which has a solubilizing action upon the melamine. Moreover, in practicing the present invention it is preferable to exclude reactants, such as ammonia, which, under certain circumstances, may interfere with the melamine-formaldehyde reaction by converting formaldehyde to hexamethylene tetramine. This can be accomplished by methods hereinafter illustrated.

It will be understood, of course, that resin-forming ingredients other than melamine and formaldehyde may be present if desired. For example, phenol, biuret, urea or urea-formaldehyde reaction products which are stable under the processing conditions may be included in the reaction mixture. One form of urea-formaldehyde condensation product which is sufficiently stable for use in the practice of the present invention is the remarkably stable urea-formaldehyde liquid composition which is disclosed in the Kvalnes patent, Re. 23,174. The latter composition is formed by preparing a liquid mixture from gaseous formaldehyde and water at a temperature of 60° to 90° C., the weight of formaldehyde being from 50% to 70% of the weight of the resultant aqueous liquid mixture, keeping the temperature of the said aqueous liquid continuously above 45° C. until the said liquid is brought into contact with urea, admixing urea with the said liquid at a pH within the range of 7.0 to 9.0, the amount of the said urea being in the proportion of one mol per 4.5 to 10 mols of the said formaldehyde, and maintaining the temperature of the resultant liquid at least momentarily at from 70° to 90° C., whereby a product which remains a clear liquid when cooled to 50° C. is obtained.

The liquid urea-formaldehyde composition of Kvalnes is relatively stable at temperatures as high as about 160°, i. e. it can be heated for short periods of time (0.5 to 10 minutes) at elevated temperatures without excessive degradation or resinification. Accordingly the said liquid may be admixed with the melamine quench liquor (after stripping of ammonia and $CO_2$) without cooling the liquor to such an extent that the melamine separates out in crystalline form.

The removal of ammonia and $CO_2$ from the quench liquor may be accomplished in a continuous still into which the quench liquor is fed at an intermediate level in the column. The stripped quench liquor is removed at the base of the column and a condensate of water-$CO_2$-$NH_3$-ammonium carbamate is withdrawn from the top of the column. The data for operation of this ammonium carbamate stripping still are given below:

TABLE

*Ammonium carbamate stripping still operation data*

| Run No. | 1 | 2 | 3 | 4 |
|---|---|---|---|---|
| Still Pressure (p. s. i.) | 48 | 51 | 50 | 51 |
| Temperatures, ° C.: | | | | |
| Condenser Water Inlet | 111 | 57 | 80 | 80 |
| Condenser Water Exit | 106 | 88 | 92 | 104 |
| Off-gas | 122 | 106 | 104 | 120 |
| Feed Plate | 100 | 125 | 125 | 125 |
| Calandria (pot) | 150 | 153 | 152 | 153 |
| Flow Rates, lbs./hr.: | | | | |
| Feed | 129 | 88 | 132 | 132 |
| Reflux | 31 | 29 | 29.5 | 31 |
| Total Boil-up | 51 | 37 | 43.5 | 51 |
| Reflux Ratio | 1.5:1 | 3.5:1 | 2:1 | 1.5:1 |
| Compositions: | | | | |
| Mol Percent $H_2O$ in Drawn-Off Condensate | 74 | 52 | 58 | 72 |
| Mol Percent $H_2O$ in Reflux | | | 68 | 84 |
| Wt. Percent $NH_3$ in Tails | .057 | .078 | .036 | .018 |
| Wt. Percent $NH_3$ in Feed | 2.02 | 2.72 | 1.17 | .60 |
| Wt. Percent $CO_2$ in Tails | .112 | .142 | .096 | .087 |
| Wt. Percent $CO_2$ in Feed | 3.02 | 4.34 | 2.55 | 2.42 |

The liquor from the draw-off at the base of the column is rich in melamine, and can be directly converted to melamine formaldehyde condensation products without intermediate crystallization of melamine. To prevent precipitation, however, it is essential to avoid extremes of alkaline or acidic pH, and best results are thus obtained at a pH of 7 to 9. It is also necessary, in avoiding precipitation, to control the ratio of formaldehyde:melamine, a large excess of free formaldehyde being necessary at elevated temperatures (120° to 160° C.); a suitable range of formaldehyde:melamine mol ratio is about 4:1 to 15:1. The content of water should preferably be high enough to prevent crystallization of the melamine, a suitable weight ratio of water:melamine being within the range of 2:1 to 5:1.

The invention is illustrated further by means of the following example.

*Example.*—Molten urea is pumped continuously through a silver-lined tubular converter under a pressure of 400 atmospheres at 400° C. The resulting molten melamine-containing product, as it passes through the exit conduit of the pyrolysis vessel, is subjected to the action of a stream of water introduced through a T in the exit line under a pressure of 400 atmospheres; the resulting aqueous solution is conducted continuously through a pressure let-down valve and a stripper column, wherein ammonia and $CO_2$ are stripped from the aqueous mixture by lowering the pressure to about 4 atmospheres. The ammonia and carbon dioxide together with volatilized water are withdrawn as an ammonium carbamate aqueous condensate from the top of the column. The aqueous stripper effluent having a temperature of about 140° C. is not permitted to cool, but, as the effluent leaves the stripper column, it is subjected to the action of 37% aqueous formaldehyde (formalin), which is injected through a T at the rate of 256 parts by weight of formalin per 100 parts of melamine. On cooling, a clear stable liquid aqueous melamine-formaldehyde product having a solids content of 50% by weight is obtained. The experiment is repeated using, in place of the 37% formaldehyde, a urea-formaldehyde liquid having an F/U ratio of 5 and prepared as described in the Kvalnes Reissue Patent 23,174 (cf. description hereinabove given). The weight proportions added are 32.4 parts of the UF liquid and 6.8 parts of water per 12.6 parts of melamine. A colorless stable liquid aqueous melamine-urea-formaldehyde product having a solids content of 65% by weight is obtained. The experiment is repeated again using as the injected formaldehyde-containing liquid a mixture of 3.7 parts urea, 26.6 parts of paraformaldehyde and 55.6 parts of formalin. On cooling to room temperature a colorless stable liquid melamine-formaldehyde aqueous product having a solids content of 65% is obtained.

The drawing which is appended hereto illustrates a typical procedure which may be followed in practicing the present invention. In the embodiment illustrated in the drawing an aqueous quench liquor containing urea pyrolysis products including melamine (obtainable by the process of U. S. P. 2,549,492 as explained hereinabove) is conducted into a stripper column in which it is distilled under pressure and from which aqueous ammonium carbamate is removed as condensate. The melamine-containing residue is treated with 60% formaldehyde at 120° to 160° C., under sufficient pressure to maintain the water in the liquid phase, e. g. at least about 28 pounds per square inch, guage. The liquid product thus obtained is haze free.

The products obtained in the practice of this invention are highly valuable and useful as adhesives and in the manufacture of moldings, high wet-strength paper, wood impregnating agents, textile finishes, leather-impregnating agents, coating compositions (including those which are butanol-modified), floor coverings, abrasive articles, etc.

We claim:

1. A process for preparing a liquid aqueous melamine-formaldehyde reaction product, free of precipitate, which comprises heating formaldehyde with an aqueous solution of melamine at 120° to 160° C. under sufficient pressure to maintain the water in the liquid phase, the mol ratio of formaldehyde:melamine being from 4:1 to 15:1, the weight proportion of water:melamine being between 2:1 and 5:1, at a pH of 7 to 9.

2. A process for preparing liquid aqueous melamine-formaldehyde reaction products, free of precipitate, which comprises reacting formaldehyde with aqueous melamine under superatmospheric pressure by injecting a stream of aqueous formaldehyde into a stream of aqueous melamine under superatmospheric pressure at a temperature of 120° to 160° C.

3. The process of claim 2 wherein the aqueous formaldehyde which is injected contains 60% by weight of formaldehyde, the total weight ratio of water:melamine in the reaction mixture being 2:1 to 5:1.

WALTER M. BRUNER.
HAMLINE M. KVALNES.

References Cited in the file of this patent

UNITED STATES PATENTS

| Number | Name | Date |
|---|---|---|
| 2,368,451 | D'Alelio | Jan. 30, 1945 |
| 2,448,338 | Widmer | Aug. 31, 1948 |
| 2,537,131 | Grossman | Jan. 9, 1951 |

FOREIGN PATENTS

| Number | Country | Date |
|---|---|---|
| 583,504 | Great Britain | Dec. 19, 1946 |